US008767866B2

(12) United States Patent
Choi et al.

(10) Patent No.: US 8,767,866 B2
(45) Date of Patent: Jul. 1, 2014

(54) METHOD AND APPARATUS FOR WEIGHT FACTOR MATRIX DETERMINATION FOR BEAM FORMING

(75) Inventors: Bal Geum Choi, Gyeonggi-do (KR); Jung Hyun Heo, Gyeonggi-do (KR)

(73) Assignee: Intellectual Discovery Co., Ltd., Seoul (KR)

( * ) Notice: Subject to any disclaimer, the term of this patent is extended or adjusted under 35 U.S.C. 154(b) by 136 days.

(21) Appl. No.: 13/141,973

(22) PCT Filed: Dec. 23, 2009

(86) PCT No.: PCT/KR2009/007752
§ 371 (c)(1),
(2), (4) Date: Oct. 23, 2011

(87) PCT Pub. No.: WO2010/074523
PCT Pub. Date: Jul. 1, 2010

(65) Prior Publication Data
US 2012/0114066 A1 May 10, 2012

(30) Foreign Application Priority Data
Dec. 23, 2008 (KR) .......................... 10-2008-0132185

(51) Int. Cl.
*H04L 27/00* (2006.01)
(52) U.S. Cl.
USPC ........................................ 375/295; 455/127.1

(58) Field of Classification Search
USPC ........................................ 375/295; 455/127.1
See application file for complete search history.

(56) References Cited

U.S. PATENT DOCUMENTS

| 7,822,141 B2 * | 10/2010 | Wight ............................ 375/267 |
| 2004/0013180 A1 | 1/2004 | Giannakis et al. |
| 2005/0286650 A1 * | 12/2005 | Han et al. ...................... 375/267 |
| 2010/0142390 A1 * | 6/2010 | Sun et al. ....................... 370/252 |

FOREIGN PATENT DOCUMENTS

| KR | 10-2001-0101042 | 11/2001 |
| KR | 10-2005-0064716 | 6/2005 |
| KR | 10-2005-0077217 | 8/2005 |
| KR | 10-0705448 | 4/2007 |
| KR | 10-2007-0105015 | 10/2007 |

* cited by examiner

*Primary Examiner* — Michael Neff
(74) *Attorney, Agent, or Firm* — Sughrue Mion, PLLC

(57) ABSTRACT

Disclosed is a weight factor matrix determining method for beamforming in a base station in order for inter-cell interference to be removed. The weight factor matrix determining method for beamforming which includes: determining a first transmission power for a first terminal being a target terminal and a second transmission power for a plurality of second terminals other than the target terminal; calculating an Eigen vector with an Eigen value for a ratio of the first and second transmission powers; and determining a weight factor matrix in a serving base station, with the calculated Eigen vector.

19 Claims, 3 Drawing Sheets

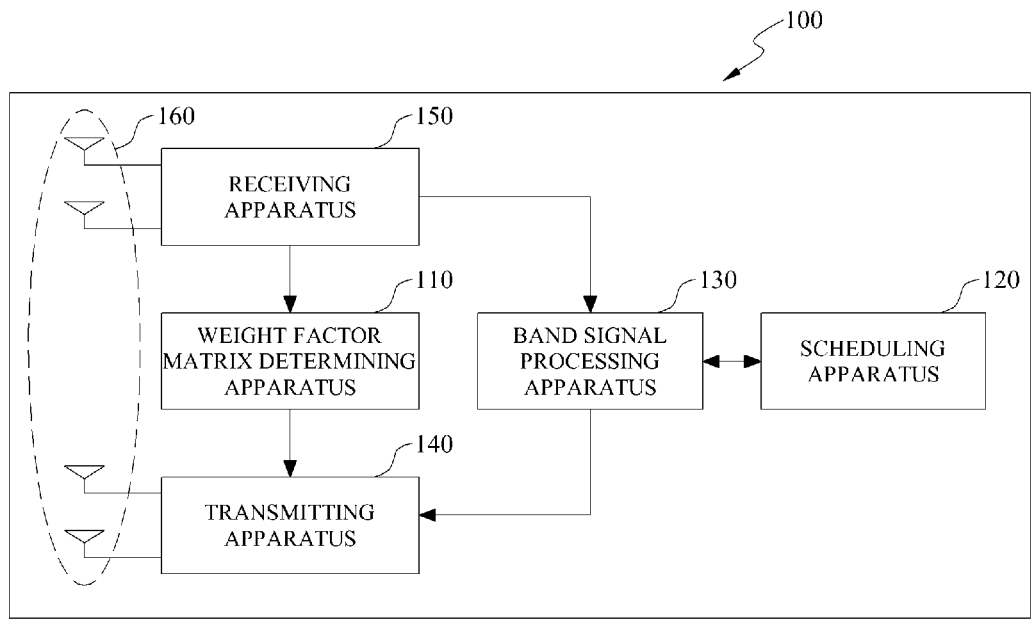
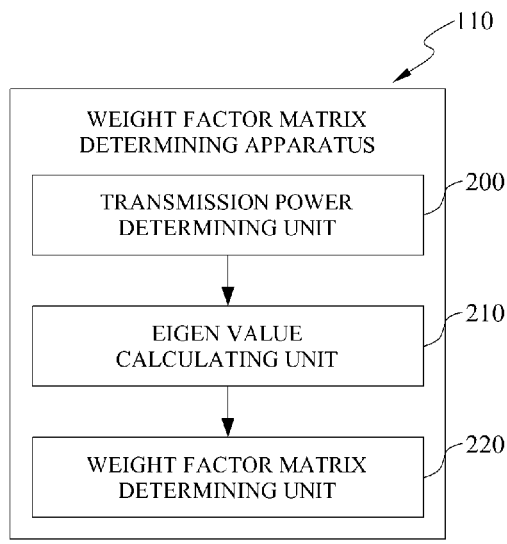

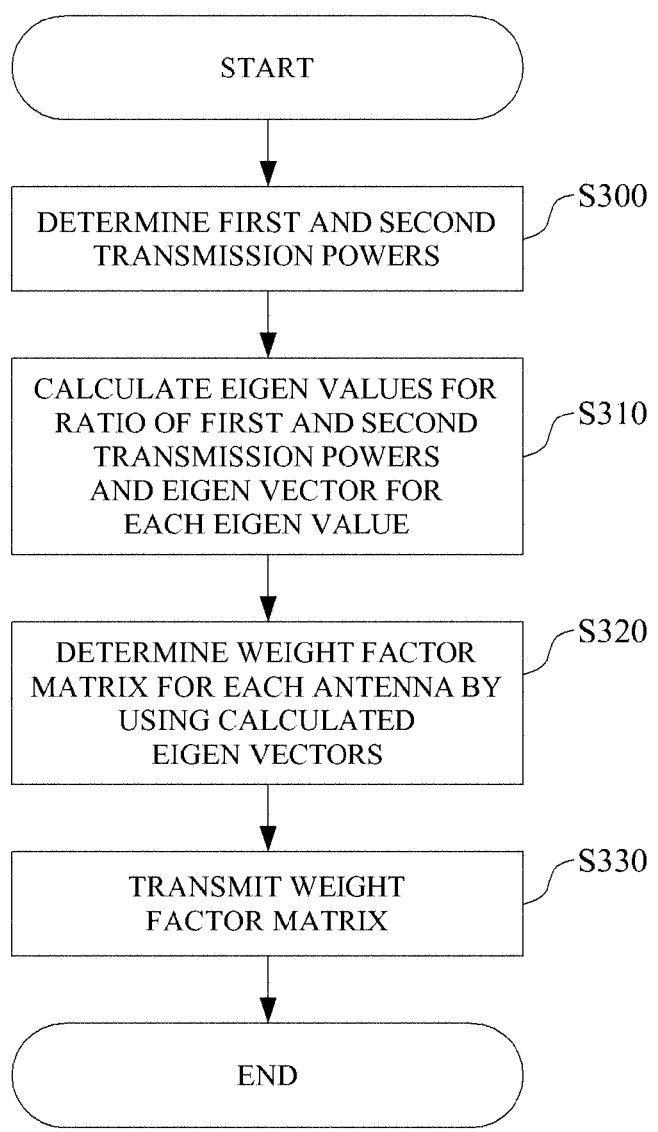

METHOD AND APPARATUS FOR WEIGHT FACTOR MATRIX DETERMINATION FOR BEAM FORMING

TECHNICAL FIELD

The present invention relates to a wireless communication system, and more particularly, to a weight factor matrix determining method and apparatus for beamforming in a wireless communication system.

BACKGROUND ART

Due to the advance of communication technologies and content industries, recently, large-scale data is increasingly required to be transmitted at a high speed over a wireless channel. To transmit data at a high speed, a high transmission output and a wide transmission bandwidth are required compared to general data transmission. To perform high-speed communication, a method is required for reducing an interference signal and efficiently transferring a desired signal. As such a method, there is a smart antenna technology, namely, beamforming. Herein, beamforming as a type of smart antenna is technology that restricts transmitting or receiving antenna beam only to a target terminal as if spotlight is directed only to an actor on a stage.

To realize such a beamforming technology, a base station is required to determine a weight factor matrix for each transmitting antenna. As an algorithm for determining the weight factor matrix, a zero forcing algorithm has been proposed. The zero forcing algorithm is an algorithm which determines a weight factor matrix such that a transmitted signal toward a terminal other than a target terminal becomes zero, and thus decreases an inter-cell interference signal and a noise component.

However, the zero forcing algorithm is applied only when the number of antennas of a base station is greater than the number of antennas of all terminals, but since there are a plurality of terminals using the same channel at a multi-cell environment, the zero forcing algorithm is not useful at an actual communication environment. Therefore, a weight factor matrix determining algorithm that is capable of application irrespective of the number of transmitting and receiving antennas is required.

DETAILED DESCRIPTION OF THE INVENTION

Technical Problem

The present invention provides a method which can determine a weight factor matrix in a base station in order for inter-cell interference to be removed.

The present invention also provides a method and apparatus which can determine a weight factor matrix in a base station by using a transmission power for a terminal.

The present invention also provides a weight factor matrix determining method and apparatus, which can determine a weight factor matrix by using the ratio of a transmission power for a target terminal and a transmission power for a terminal other than the target terminal.

Technical Solution

To achieve these and other advantages and in accordance with the purpose of the invention, as embodied and broadly described herein, there is provided a weight factor matrix determining method for beamforming which includes: determining a first transmission power for a first terminal being a target terminal and a second transmission power for a plurality of second terminals other than the target terminal; calculating an Eigen vector with an Eigen value for a ratio of the first and second transmission powers; and determining a weight factor matrix in a serving base station, with the calculated Eigen vector.

In the calculating of an Eigen vector, the Eigen vector may be calculated according to a level of the Eigen value.

The determining of a first transmission power may sequentially determine the weight factor matrix according to a sequence of the Eigen vector, the sequence of the Eigen vector being a level sequence of the Eigen value.

The number of calculated Eigen vectors may be determined as the number of streams transmitted from the serving base station.

The first transmission power may be determined using the weight factor matrix and a first channel response matrix between the serving base station and first terminal.

The first channel response matrix may be estimated using a sounding symbol shared by the serving base station and the first terminal.

The first channel response matrix may be determined with a codeword corresponding to a codeword which is fed back from the first terminal among a plurality of codewords shared by the serving base station and the first terminal.

The first channel response matrix may be determined and provided by the first terminal.

The first transmission power may be determined using a trace value for multiplication of a conjugate transpose matrix of the weight factor matrix, a conjugate matrix of a first channel response matrix between the serving base station and first terminal, the first channel response matrix, and the weight factor matrix.

The second transmission power may be determined using the weight factor matrix and a second channel response matrix between the serving base station and second terminal.

The second transmission power may be determined using a trace value for multiplication of a conjugate transpose matrix of the weight factor matrix, a sum of results which are obtained by multiplying a conjugate matrix of a second channel response matrix between the serving base station and the second terminal and the second channel response matrix, and the weight factor matrix.

The second transmission power may be determined using a sum of results which are obtained by multiplying a conjugate matrix of a second channel response matrix between the serving base station and second terminal and the second channel response matrix. The sum of results, which are obtained by multiplying the conjugate matrix of the second channel response matrix between the serving base station and the second terminal and the second channel response matrix, may be defined as a value which is obtained by subtracting multiplication of a conjugate matrix of a first channel response matrix between the serving base station and first terminal and the first channel response matrix from a correlation matrix of uplink signals respectively received from the first and second terminals.

The Eigen value may be calculated using the ratio of the first and second transmission powers and white noise in a downlink channel.

In another aspect of the present invention, there is provided a weight factor matrix determining apparatus for beamforming which includes: a transmission power determining unit determining a plurality of transmission powers for respective terminals; an Eigen value calculating unit calculating an Eigen value, defined as a ratio of first and second transmission powers, by using a first transmission power for the first terminal being a target terminal and a second transmission power for the second terminal among the transmission powers, and calculating an Eigen vector corresponding to the Eigen value; and a weight factor matrix determining unit determining a weight factor matrix with the calculated Eigen vector.

In another aspect of the present invention, there is provided a base station including: a receiving apparatus receiving uplink signals which are respectively transmitted from a first terminal being a target terminal and a plurality of second terminals other than the target terminal; a weight factor matrix determining apparatus calculating an Eigen value for a ratio of a first transmission power for the first terminal and a second transmission power for the second terminals which are determined using the received uplink signals and an Eigen vector corresponding to the Eigen value, and determining a weight factor matrix to be reflected in a downlink signal by using the calculated Eigen vector; and a transmitting apparatus reflecting the determined weight factor matrix in the downlink signal to transmit the downlink signal to the first and second terminals.

Advantageous Effect

According to the present invention, by determining a weight factor matrix for each antenna in a base station, there is an effect that can remove inter-cell interference.

Moreover, since the present invention determines the weight factor matrix by using a transmission power for each terminal, the present invention can determine the weight factor matrix without restriction by the number of terminals and thus be easily applied at an actual wireless communication environment.

Moreover, since the present invention determines the weight factor matrix by using the ratio of a transmission power for a target terminal and a transmission power for a terminal other than the target terminal, the present invention that can reduce the complexity of calculation for determining the weight factor matrix.

BRIEF DESCRIPTION OF THE DRAWINGS

FIG. 1 is a block diagram illustrating a schematic configuration of a base station according to an embodiment of the present invention.

FIG. 2 is a block diagram illustrating a detailed configuration of a weight factor matrix determining apparatus illustrated in FIG. 1.

FIG. 3 is a flowchart illustrating a weight factor matrix determining method for beamforming, according to an embodiment of the present invention.

MODE FOR THE INVENTION

Figure 4:
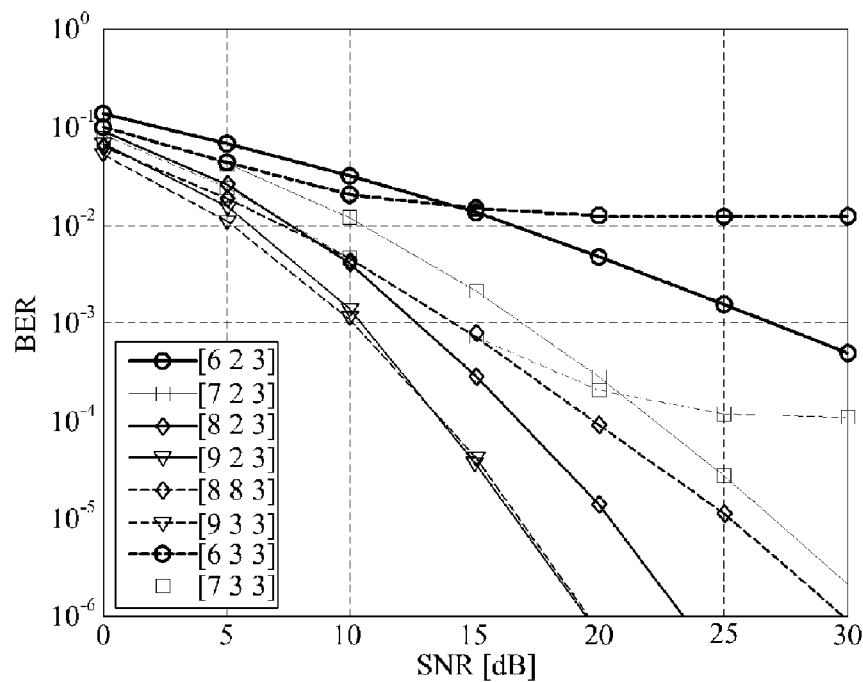
FIGS. 4 and 5 are diagrams showing a compared result which is obtained by comparing performance of the related art and performance of a weight factor matrix determining method for beamforming according to an embodiment of the present invention.

Hereinafter, an embodiment of the present invention will be described in detail with reference to the accompanying drawings.

FIG. 1 is a block diagram schematically illustrating a configuration of a base station according to an embodiment of the present invention. Referring to FIG. 1, a base station 100 may be applied to a wireless communication system at a Multi Input Single Output (MISO) or Multi Input Multi Output (MIMO) environment. That is, the base station 100 transmits/receives data to/from a terminal having one transmitting and receiving antenna or a plurality of transmitting and receiving antennas by using a plurality of transmitting and receiving antennas that are arranged in the base station 100.

The base station 100, as illustrated in FIG. 1, includes a weight factor matrix determining apparatus 110, a scheduling apparatus 120, a band signal processing apparatus 130, a transmitting apparatus 140, a receiving apparatus 150, and a plurality of transmitting and receiving antennas 160.

The weight factor matrix determining apparatus 110 determines a weight factor matrix for beamforming for each antenna 160 arranged in the base station 100, and determines the weight factor matrix by using an Eigen factor by which the ratio of a transmission power for a first terminal being a target terminal and a transmission power for a plurality of second terminals other than the target terminal is the maximum. For this end, as illustrated in FIG. 2, the weight factor matrix determining apparatus 110 includes a transmission power determining unit 200, an Eigen value calculating unit 210, and a weight factor matrix determining unit 220.

First, the transmission power determining unit 200 determines a first transmission power of a first downlink signal transmitted to the first terminal, and a second transmission power of a second downlink signal transmitted to the second terminals. In this case, the first downlink signal transmitted to the first terminal may be defined as Equation (1) below, and the second downlink signal transmitted to the second terminals may be defined as Equation (2) below.

$$\text{First downlink signal} = H_{1,1} W_1 \overline{s_1} \tag{1}$$

$$\text{Second downlink signal} = H_{1,2} W_1 \overline{s_1} + \ldots + H_{1,k} W_1 \overline{s_1} \tag{2}$$

where $H_{1,1}$ indicates a first channel response matrix between the base station 100 and the first terminal, $H_{1,k}$ indicates a second channel response matrix between the base station 100 and a kth terminal of the second terminals, $W_1$ indicates a weight factor matrix determined by the below-described weight factor matrix determining unit 120, and $\overline{s_1}$ indicates a downlink stream transmitted from the base station 100 to each terminal.

The transmission power determining unit 200 may determine a transmission power of a downlink signal transmitted to each terminal, with the multiplication of the downlink signal transmitted to each terminal and a conjugate transpose matrix of the downlink signal transmitted to each terminal. In this case, a first transmission power of the first downlink signal is defined as Equation (3) below, and a second transmission power of the second downlink signal is defined as Equation (4) below.

$$\text{First transmission power} = \{H_{1,1} W_1 \overline{s_1}\}^H \{H_{1,1} W_1 \overline{s_1}\} \tag{3}$$

$$\text{Second transmission power} = \sum_{k=2}^{K} \{H_{1,k} W_1 \overline{s_1}\}^H \{H_{1,k} W_1 \overline{s_1}\} \tag{4}$$

where $\{X\}^H$ indicates a conjugate transpose matrix of a matrix 'X'.

Since there is no correlation between streams and each stream has a constant average symbol power, a relationship such as Equation (5) below is established. Therefore, the first transmission power defined as Equation (3) may be defined as Equation (6) below, and the second transmission power defined as Equation (4) may be defined as Equation (7) below.

$$\overline{ss}^H = E_S I \quad (5)$$

$$\text{First transmission power} = E_S Tr\{(H_{1,1}W_1)^H(H_{1,1}W_1)\} = E_S Tr\{(W_1^H H_{1,1}^H H_{1,1} W_1)\} \quad (6)$$

$$\text{Second transmission power} = E_S Tr\left\{\sum_{k=2}^{K}(H_{1,k}W_1)^H(H_{1,k}W_1)\right\} = \quad (7)$$

$$E_S Tr\left\{\sum_{k=2}^{K} W_1^H H_{1,k}^H H_{1,k} W_1\right\} = E_S Tr\left\{W_1^H \left(\sum_{k=2}^{K} H_{1,k}^H H_{1,k}\right) W_1\right\}$$

where Tr(X) denotes trace on a matrix 'X'.

In Equations (1), (3) and (6), a first channel response matrix that is used to determine the first transmission power is first required to be obtained for multiplying the first channel response matrix and a conjugate transpose matrix of the first channel response matrix. The transmission power determining unit 200 may obtain the first channel response matrix through various schemes. In an embodiment of the present invention, when a sounding symbol shared by the first terminal is received from the first terminal, the transmission power determining unit 200 may estimate the first channel response matrix from the received sounding symbol.

In another embodiment of the present invention, when the first terminal estimates a downlink channel and then selects one of codewords shared by the base station 100 with the estimated result of the channel to transmit the selected codeword, the transmission power determining unit 200 may determine the first channel response matrix with the codeword transmitted from the first terminal.

In another embodiment of the present invention, the transmission power determining unit 200 may receive the first channel response matrix which has been estimated by the first terminal and is directly fed back from the first terminal.

The transmission power determining unit 200 cannot directly estimate the multiplication of the second channel response matrix that is used to determine the second transmission power and a conjugate transpose matrix of the second channel response matrix, from Equations (2), (4) and (7). Therefore, the transmission power determining unit 200 may determine the multiplication of the second channel response matrix that is used to determine the second transmission power and a conjugate transpose matrix of the second channel response matrix, by using the uplink signal that is received from each terminal through the below-described receiving apparatus 150 and the above-described first channel response matrix and conjugate transpose matrix of the first channel response matrix.

Specifically, the transmission power determining unit 200 calculates a correlation matrix of an uplink signal that is expressed in Equation (9) below, with the uplink signal expressed in Equation (8) below.

$$\overline{y_1} = H_{1,1}^H \overline{s_1} + \sum_{i=2}^{K} H_{1,i}^H \overline{s_i} \quad (8)$$

$$\overline{y_1}\,\overline{y_1}^H = E_S H_{1,1}^H H_{1,1} + E_S \sum_{i=2}^{K} H_{1,i}^H H_{1,i} \quad (9)$$

where $\overline{y_1}$ indicates an uplink signal, $\overline{y_1y_1}^H$ indicates a correlation matrix of the uplink signal.

In Equations (8) and (9), for convenience, noise in an uplink channel has been ignored.

Subsequently, the transmission power determining unit 200 calculates a difference between $$E_S H_{1,1}^H H_{1,1} + E_S \sum_{i=2}^{K} H_{1,i}^H H_{1,i}$$

that is the correlation matrix of the uplink signal expressed in Equation (9) and $H_{1,1}^H H_{1,1}$ that is the multiplication of the first channel response matrix and the conjugate transpose matrix of the first channel response matrix, and thus calculates $$\sum_{i=2}^{K} H_{1,i}^H H_{1,i}$$

that is the multiplication of the second channel response matrix and the conjugate transpose matrix of the second channel response matrix.

The Eigen value calculating unit 210 determines the ratio of the first and second transmission powers determined by the transmission power determining unit 200, and calculates a plurality of Eigen values for the determined ratio and an Eigen vector corresponding to each Eigen value. When the first transmission power is expressed as Equation (6) and the second transmission power is expressed as Equation (7), the ratio of the first and second transmission powers may be expressed as Equation (10) below.

$$\text{Ratio} = \frac{E_S Tr\{W_1^H H_{1,1}^H H_{1,1} W_1\}}{E_S Tr\left\{W_1^H \left(\sum_{k=2}^{K} H_{1,k}^H H_{1,k}\right) W_1\right\}} = \frac{Tr\{W_1^H H_{1,1}^H H_{1,1} W_1\}}{Tr\left\{W_1^H \left(\sum_{k=2}^{K} H_{1,k}^H H_{1,k}\right) W_1\right\}} \quad (10)$$

Accordingly, when an Eigen value for the ratio of the first and second transmission powers expressed in Equation (10) is assumed as $\lambda_\alpha$, Equation (10) may be developed into Equation (11) below.

$$\frac{Tr\{W_1^H H_{1,1}^H H_{1,1} W_1\}}{Tr\left\{W_1^H \left(\sum_{k=2}^{K} H_{1,k}^H H_{1,k}\right) W_1\right\}} = \lambda_\alpha \quad (11)$$

In Equation (11), if the number of streams provided as service is one, Equation (11) may be developed into Equation (12) below, which may be developed into Equation (13) below and then finally developed into Equation (14) below.

$$\frac{W_1^H H_{1,1}^H H_{1,1} W}{W_1^H \left(\sum_{k=2}^{K} H_{1,k}^H H_{1,k}\right) W_1} = \lambda_\alpha \quad (12)$$

$$W_1^H H_{1,1}^H H_{1,1} W_1 = \lambda_\alpha W_1^H \left(\sum_{k=2}^{K} H_{1,k}^H H_{1,k}\right) W_1 \quad (13)$$

$$H_{1,1}^H H_{1,1} W_1 = \lambda_a \left( \sum_{k=2}^{K} H_{1,k}^H H_{1,k} \right) W_1 \quad (14)$$

Herein, it can be seen that Equation (14) indicates an Eigen value problem. Therefore, if the rank of a matrix "$H_{1,1}{}^H H_{1,1}$" is R, R number of Eigen values and Eigen vectors respectively corresponding to the calculated R Eigen values may be calculated from Equation (14).

The above-described embodiment has been described as calculating each Eigen value with no consideration of white noise existing in a downlink channel, but in a modified embodiment, each Eigen value may be calculated in consideration of the white noise existing in the downlink channel. When calculating each Eigen value in consideration of the white noise existing in the downlink channel, Equation (15) may be substituted for Equation (14).

$$H_{1,1}^H H_{1,1} W_1 = \lambda_a \left( \sum_{k=2}^{K} H_{1,k}^H H_{1,k} + N_0 I \right) W_1 \quad (15)$$

In this case, when it is unable to accurately know the white noise existing in the downlink channel, the Eigen value calculating unit 210 may regard white noise existing in an uplink channel as the white noise existing in the downlink channel.

The weight factor matrix determining unit 220 determines a weight factor matrix for each antenna arranged in the base station 100, with Eigen vectors calculated by the Eigen value calculating unit 210. According to an embodiment of the present invention, in determining the weight factor matrix, the weight factor matrix determining unit 220 may determine an Eigen vector, which will be used to determine a weight factor matrix, from among the calculated Eigen vectors in descending sequence of Eigen value corresponding to a pertinent Eigen vector. In this case, the number of Eigen vectors to be used for the weight factor matrix may be determined according to the number of streams provided by the base station 100.

For example, when the number of streams provided by the base station 100 is one, the weight factor matrix determining unit 200 may determine a weight factor matrix by using an Eigen vector corresponding to the maximum Eigen value among a plurality of Eigen vectors. Also, when the number of streams provided by the base station 100 is two, the weight factor matrix determining unit 200 may determine a weight factor matrix by using an Eigen vector corresponding to the maximum Eigen value among a plurality of Eigen vectors and an Eigen vector corresponding to the highest Eigen value after the maximum Eigen value.

In this way, the weight factor matrix determining apparatus 110 may calculate the ratio of the first transmission power for the first terminal being the target terminal and the second transmission power for the second terminals other than the target terminal, determine the weight factor matrix with the Eigen vectors that allow the ratio to be the maximum, and thus can be applied regardless of the number of transmitting and receiving antennas of a base station.

Referring again to FIG. 1, the scheduling apparatus 120 finds a channel having performance optimal for each terminal, and then performs a scheduling operation in order for the channel having optimal performance to be allocated to each terminal. The scheduling apparatus 120 determines a rule for distributing an available wireless resource of the base station 100 to each terminal, and checks an allocatable queue in an entire burst area of an uplink subframe and downlink subframe of a current frame for transmitting and receiving a downlink signal to be transmitted to each terminal per frame to allocate and manage a subchannel.

The band signal processing apparatus 130 extracts a data bit from the uplink signal that has been received through the below-described receiving apparatus 150, and performs a demodulating operation, a decoding operation, and an error correcting operation, in a receiving path. The received information is transferred to an adjacent wired/wireless network (not shown) through an interface (not shown), or transmitted to each terminal, receiving service from the base station 100, through a transmitting path. Also, the band signal processing apparatus 130 encodes a downlink signal and control signal provided from the scheduling apparatus 120, and provides the encoded signals to the transmitting apparatus 130, in a transmitting path.

The transmitting apparatus 140 transmits a scheduled downlink signal, outputted from the scheduling apparatus 120, to each terminal through the antennas 160. In this case, the transmitting apparatus 140 reflects the weight factor values, determined by the weight factor matrix determining apparatus 110, in the downlink signal per antenna through which the downlink signal is transmitted, and transmits the downlink signal to each terminal through the antennas 160. The type of the downlink signal transmitted to the first terminal by the transmitting apparatus 140 has been described above with reference to Equation (1), and the type of the downlink signal transmitted to the second terminals has been described above with reference to Equation (2). Therefore, a detailed description on the type of the downlink signal will not be provided below.

The transmitting apparatus 140 modulates a downlink signal, allocated to a frame according to the scheduled result of the scheduler 120, into a carrier wave signal having a desired one transmission frequency or a plurality of transmission frequencies, and amplifies the modulated carrier wave signal to a level suitable for transmission to transmit the amplified signal to an air through the antennas 160.

The receiving apparatus 150 receives an uplink signal from each terminal through the antennas 160 and supplies the uplink signal to the weight factor matrix determining apparatus 110 and the band signal processing apparatus 130. A signal received from each terminal by the receiving apparatus 150 has been described above with reference to Equation (8), and thus, its detailed description will not be provided below. In Equation (8), noise existing in an uplink channel has been ignored. Considering the noise existing in the uplink channel, however, Equation (16) below may be substituted for Equation (8), and thus, Equation (17) below may be substituted for Equation (9).

$$\overline{y_1} = H_{1,1}^H \overline{s_1} + \sum_{i=2}^{K} H_{1,i}^H \overline{s_i} + \overline{n_1} \quad (16)$$

$$\overline{y_1} \overline{y_1}^H = E_S H_{1,1}^H H_{1,1} + E_S \sum_{i=2}^{K} H_{1,i}^H H_{1,i} + N_0 I \quad (17)$$

The receiving apparatus 150 converts an uplink signal, received from each terminal, to a baseband signal. For example, the receiving apparatus 150 removes noise from the uplink signal and amplifies the uplink signal, for receiving data of the base station 100. The receiving apparatus 150 down-converts the amplified signal to a baseband signal, and digitalizes the down-converted baseband signal.

Hereinafter, a weight factor matrix determining method for beamforming according to an embodiment of the present invention will be described with reference to FIG. 3.

FIG. 3 is a flowchart illustrating a weight factor matrix determining method for beamforming, according to an embodiment of the present invention.

Referring to FIG. 3, the weight factor matrix determining apparatus determines the first transmission power for the first terminal being the target terminal and the second transmission power for the second terminals other than the target terminal in operation S300. In this case, the transmission power for each terminal may be determined by multiplying a downlink signal transmitted to each terminal and a conjugate transpose matrix of the downlink signal. Herein, the first transmission power may be finally defined as Equation (6), and the second transmission power may be finally defined as Equation (7).

In this case, the first channel response matrix that is used to determine the first transmission power is first required to be obtained for multiplying the first channel response matrix and the conjugate transpose matrix of the first channel response matrix. The first channel response matrix may be estimated with a sounding symbol shared by the first terminal and the base station, and determined with a codeword that is transmitted from the first terminal among codewords shared by the first terminal and the base station. In another embodiment of present invention, the first channel response matrix estimated by the first terminal may be directly fed back from the first terminal.

The multiplication of the second channel response matrix, used to determine the second transmission power, and the conjugate transpose matrix of the second channel response matrix may be determined using the uplink signal received from each terminal, the first channel response matrix, and the conjugate transpose matrix of the first channel response matrix. This has been described above with reference to Equations (8) and (9), and thus, its detailed description will not be provided.

Subsequently, the weight factor matrix determining apparatus calculates Eigen values for the ratio of the first and second transmission powers and Eigen vectors respectively corresponding to the Eigen values in operation S310. Herein, since the ratio of the first and second transmission powers may be determined as Equation (10), the Eigen values for the ratio of the first and second transmission powers may be calculated by a method of solving a typical Eigen value problem as in Equation (14).

In an operation of calculating the Eigen values, the weight factor matrix determining apparatus may calculate the Eigen values in consideration of white noise existing in a downlink channel, but when it is unable to accurately know the white noise existing in a downlink channel, white noise existing in an uplink channel may be regarded as the white noise existing in the downlink channel.

In operation S320, the weight factor matrix determining apparatus determines a weight factor matrix for each antenna arranged in the base station, with the Eigen vectors that have been calculated in operation S310. According to an embodiment of the present invention, in determining the weight factor matrix, the weight factor matrix determining apparatus may determine an Eigen vector, which will be used to determine a weight factor matrix, in descending sequence of Eigen value corresponding to each Eigen vector among the Eigen vectors which have been calculated in operation S310. In this case, the number of Eigen vectors to be used for the weight factor matrix may be determined according to the number of streams provided by the base station.

For example, when the number of streams provided by the base station is one, the weight factor matrix determining apparatus may determine the weight factor matrix by using an Eigen vector corresponding to the maximum Eigen value among a plurality of Eigen vectors. Also, when the number of streams provided by the base station 100 is two, the weight factor matrix determining unit 200 may determine a weight factor matrix by using an Eigen vector corresponding to the maximum Eigen value among the Eigen vectors and an Eigen vector corresponding to the highest Eigen value after the maximum Eigen value.

In operation S330, finally, the weight factor matrix determining apparatus reflects the weight factor matrix for each antenna, determined in operation S310, in a downlink signal to be transmitted to the first and second terminals, and transmits the downlink signal to the first and second terminals.

Figure 5:
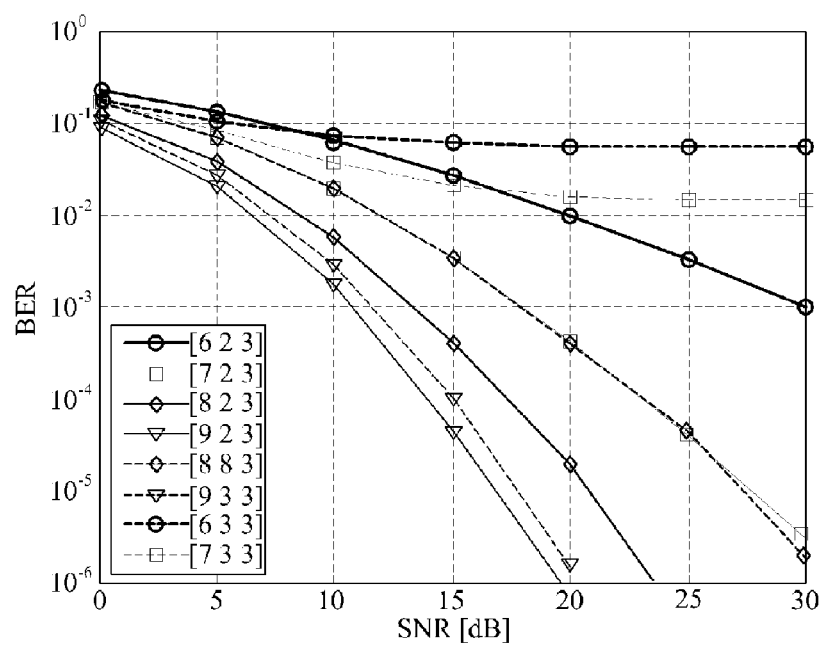

FIG. 4 is a graph showing a Bit Error Rate (BER) when a weight factor matrix has been determined by the weight factor matrix determining method according to an embodiment of the present invention. FIG. 5 is a graph showing a bit error rate when a weight factor matrix is determined by the related art. In the graphs of FIGS. 4 and 5, the leftmost number indicates the number of base station antennas, the middle number indicates the number of terminal antennas, and the rightmost number indicates the number of users.

As shown in FIGS. 4 and 5, when a Signal-to-Noise Ratio (SNR) is always constant, it can be seen that the weight factor matrix determining method according to the present invention has been improved more than the related art in BER.

The above-described weight factor matrix determining method may be realized in a program command type executable in computers and stored in a computer-readable record medium. Herein, the computer-readable record medium may include a program command, a data file, and a data structure individually, or include the combination thereof. Furthermore, program commands stored in the record medium may be designed and constructed particularly for the present invention, or known to those skilled in computer software and usable.

The computer-readable record medium is any data storage device that can store data which can be thereafter read by a computer system. Examples of the computer-readable record medium include ROMs, RAMs, CD-ROMs, DVDs, magnetic tapes, floppy disks, registers, buffers, optical data storage devices, and carrier waves (such as data transmission through the Internet). Such a record medium may be a transmission medium, which includes a carrier wave for transmitting a signal designating a program command and a data structure, such as light, a metal line, or a wave guide.

Moreover, the program command includes a high-level code, which is executable in computers by using an interpreter, as well as a machine code such as being generated by a compiler. The above-described hardware apparatus may be configured to function as one or more software modules for performing the operation of the present invention, and the reverse is similar thereto.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A weight factor matrix determining method for beamforming, comprising:
   determining a first transmission power for a first terminal being a target terminal and a second transmission power for a plurality of second terminals other than the target terminal;
   calculating an Eigen vector with an Eigen value for a ratio of the first and second transmission powers; and
   determining a weight factor matrix in a serving base station, with the calculated Eigen vector,
   wherein in the calculating of an Eigen vector, the Eigen vector is calculated according to a level of the Eigen value,
   wherein the determining of the first transmission power sequentially determines the weight factor matrix according to a sequence of the Eigen vector, the sequence of the Eigen vector being a level sequence of the Eigen value.

2. The weight factor matrix determining method according to claim 1,
   wherein the number of calculated Eigen vectors is determined as the number of streams transmitted from the serving base station.

3. The weight factor matrix determining method according to claim 1, wherein the first transmission power is determined using the weight factor matrix and a first channel response matrix between the serving base station and first terminal.

4. The weight factor matrix determining method according to claim 3, wherein the first channel response matrix is estimated using a sounding symbol shared by the serving base station and the first terminal.

5. The weight factor matrix determining method according to claim 3, wherein the first channel response matrix is determined with a codeword corresponding to a codeword which is fed back from the first terminal among a plurality of codewords shared by the serving base station and the first terminal.

6. The weight factor matrix determining method according to claim 3, wherein the first channel response matrix is determined and provided by the first terminal.

7. The weight factor matrix determining method according to claim 1, wherein the first transmission power is determined using a trace value for multiplication of a conjugate transpose matrix of the weight factor matrix, a conjugate matrix of a first channel response matrix between the serving base station and first terminal, the first channel response matrix, and the weight factor matrix.

8. The weight factor matrix determining method according to claim 1, wherein the second transmission power is determined using the weight factor matrix and a second channel response matrix between the serving base station and second terminal.

9. The weight factor matrix determining method according to claim 1, wherein the second transmission power is determined using a trace value for multiplication of a conjugate transpose matrix of the weight factor matrix, a sum of results which are obtained by multiplying a conjugate matrix of a second channel response matrix between the serving base station and the second terminal and the second channel response matrix, and the weight factor matrix.

10. The weight factor matrix determining method according to claim 1, wherein,
    the second transmission power is determined using a sum of results which are obtained by multiplying a conjugate matrix of a second channel response matrix between the serving base station and second terminal and the second channel response matrix, and the sum of results, which are obtained by multiplying the conjugate matrix of the second channel response matrix between the serving base station and the second terminal and the second channel response matrix, is defined as a value which is obtained by subtracting multiplication of a conjugate matrix of a first channel response matrix between the serving base station and first terminal and the first channel response matrix from a correlation matrix of uplink signals respectively received from the first and second terminals.

11. The weight factor matrix determining method according to claim 1, wherein the Eigen value is calculated using the ratio of the first and second transmission powers and white noise in a downlink channel.

12. A weight factor matrix determining apparatus for beamforming, comprising:
    a transmission power determiner configured to determine a plurality of transmission powers for respective terminals;
    an Eigen value calculator configured to calculate an Eigen value, defined as a ratio of first and second transmission powers, by using the first transmission power for the first terminal being a target terminal and the second transmission power for the second terminal among the transmission powers, and calculating an Eigen vector corresponding to the Eigen value; and
    a weight factor matrix determiner configured to determine a weight factor matrix with the calculated Eigen vector,
    wherein the weight factor matrix determiner determines the number of calculated Eigen vectors, which will be used for the weight factor matrix, as the number of streams transmitted from the serving base station,
    wherein when a plurality of Eigen vectors are calculated by the Eigen value calculator, the weight factor matrix determiner determines the weight factor matrix by sequentially using a certain number of Eigen vectors among the plurality of Eigen vectors in descending sequence of Eigen value.

13. The weight factor matrix determining apparatus according to claim 12, wherein the transmission power determiner determines the first transmission power by using the weight factor matrix and a first channel response matrix between a serving base station and the first terminal.

14. The weight factor matrix determining apparatus according to claim 13, wherein the first channel response matrix is determined and provided by the first terminal, estimated using a sounding symbol shared by the serving base station and the first terminal, or determined with a codeword corresponding to a codeword which is transmitted from the first terminal among a plurality of codewords shared by the serving base station and the first terminal.

15. The weight factor matrix determining apparatus according to claim 12, wherein the transmission power determiner determines the first transmission power by using a trace value for multiplication of a conjugate transpose matrix of the weight factor matrix, a conjugate matrix of a first channel response matrix between the serving base station and first terminal, the first channel response matrix, and the weight factor matrix.

16. The weight factor matrix determining apparatus according to claim 12, wherein the transmission power determiner determines the second transmission power by using the weight factor matrix and a second channel response matrix between the serving base station and second terminal.

17. The weight factor matrix determining apparatus according to claim 12, wherein the transmission power determiner determines the second transmission power by using a trace value for multiplication of a conjugate transpose matrix of the weight factor matrix, a sum of results which are obtained by multiplying a conjugate matrix of a second channel response matrix between the serving base station and the second terminal and the second channel response matrix, and the weight factor matrix.

18. The weight factor matrix determining apparatus according to claim 12, wherein,
the transmission power determiner determines the second transmission power by using a sum of results which are obtained by multiplying a conjugate matrix of a second channel response matrix between the serving base station and second terminal and the second channel response matrix, and
the sum of results, which are obtained by multiplying the conjugate matrix of the second channel response matrix between the serving base station and the second terminal and the second channel response matrix, is calculated using a value which is obtained by subtracting multiplication of a conjugate matrix of a first channel response matrix between the serving base station and first terminal and the first channel response matrix from a correlation matrix of uplink signals respectively transmitted from the first and second terminals.

19. The weight factor matrix determining apparatus according to claim 12, wherein the Eigen value calculator calculates the Eigen value by using the ratio of the first and second transmission powers and white noise in a downlink channel.

* * * * *